(12) United States Patent
Chun

(10) Patent No.: US 7,827,267 B2
(45) Date of Patent: Nov. 2, 2010

(54) METHOD AND APPARATUS FOR CONTENT SERVICE

(75) Inventor: Kang-wook Chun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 11/847,664

(22) Filed: Aug. 30, 2007

(65) Prior Publication Data

US 2008/0168132 A1    Jul. 10, 2008

(30) Foreign Application Priority Data

Jan. 4, 2007   (KR) ...................... 10-2007-0001169

(51) Int. Cl.
*G06F 15/173* (2006.01)
(52) U.S. Cl. ...................... 709/223; 709/203; 709/217; 709/224
(58) Field of Classification Search ................ 709/203, 709/217, 223, 224
See application file for complete search history.

(56) References Cited

U.S. PATENT DOCUMENTS

| | | | |
|---|---|---|---|
| 6,741,853 B1 * | 5/2004 | Jiang et al. .................. 455/418 |
| 7,305,679 B2 * | 12/2007 | Kovacs et al. ............... 719/313 |
| 7,738,883 B2 * | 6/2010 | Hull ........................ 455/456.3 |
| 2004/0203648 A1 * | 10/2004 | Wong ....................... 455/414.1 |
| 2004/0203854 A1 * | 10/2004 | Nowak ..................... 455/456.1 |
| 2004/0210647 A1 * | 10/2004 | Jin et al. ..................... 709/220 |
| 2006/0120319 A1 * | 6/2006 | Omori et al. ................ 370/328 |

FOREIGN PATENT DOCUMENTS

| | | |
|---|---|---|
| KR | 10-2003-0054104 A | 7/2003 |
| KR | 10-2006-0093803 A | 8/2006 |
| WO | WO 2006-054881 A1 | 5/2006 |

* cited by examiner

Primary Examiner—Lashonda T Jacobs
(74) Attorney, Agent, or Firm—Sughrue Mion, PLLC

(57) ABSTRACT

Provided are a method and apparatus for providing suitable a content service according to the characteristics of a client terminal, and a method and apparatus for using the content service. The method of providing the content service includes receiving device information from the client, determining a service profile including a list of content and/or services which are to be provided to the client, by analyzing the device information, and providing the content and/or services to the client according to the determined profile.

19 Claims, 7 Drawing Sheets

FIG. 7

| CLASSIFICATION | SCREEN SIZE | MAXIMUM RESOLUTION | DISPLAY TYPE | ASPECT RATIO | COLOR GAMUT | COLOR PRECISION |
|---|---|---|---|---|---|---|
| SERVICE 1 | BELOW 10" | QVGA | LCD, OLED | 4:3 | 70% | 5bit |
| SERVICE 2 | 20" LEVEL | VGA | LCD, CRT | 4:3 | 70% LEVEL | 8bit |
| SERVICE 3 | 20" LEVEL | HD | LCD, CRT | 4:3/ 16:9 | 70% LEVEL | 8bit |
| SERVICE 4 | 30" LEVEL | SD | LCD, CRT | 16:9/ 4:3 | 80% LEVEL | 8bit |
| SERVICE 5 | 30" LEVEL | HD | LCD, CRT | 16:9/ 4:3 | 80% LEVEL | 8bit |
| SERVICE 6 | 40" ~ 50" | HD | DLP, LCD, PDP | 16:9/ 4:3 | 90% ~ 100% | ~ 10bit |
| . . . | . . . | . . . | . . . | . . . | . . . | . . . |
| SERVICE n | ABOVE 50" | Full HD | DLP, LCD, PDP | DLP, LCD, PDP | ABOVE 100 | ~ 12bit |

FIG. 8

| TERMINAL | SCREEN SIZE | RESOLUTION | DISPLAY TYPE | ASPECT RATIO | COLOR PRECISION | APPLICATION SERVICE |
|---|---|---|---|---|---|---|
| PMP-1 | 4" | VGA | LCD | 4:3 | 5 bits | SERVICE-1 |
| STB-1 | 29" | SD | CRT | 4:3 | 8 bits | SERVICE-2 |
| STB-2 | 40" | HD | PDP | 16:8 | 8 bits | SERVICE-3 |
| PC | 19" | XVGA | LCD | 4:3 | 8 bits | SERVICE-4 |
| TV-1 | 29" | SD | CRT | 4:3 | 8 bits | SERVICE-2 |
| TV2 | 40" | HD | LCD | 16:9 | 8 bits | SERVICE-3 |
| ... | ... | ... | ... | ... | ... | ... |
| TV-n | 60" | FullHD | PDP | 16:9 | 10 bits | SERVICE-n |

…

METHOD AND APPARATUS FOR CONTENT SERVICE

CROSS-REFERENCE TO RELATED PATENT APPLICATION

This application claims priority from Korean Patent Application No. 10-2007-0001169, filed on Jan. 4, 2007, in the Korean Intellectual Property Office, the disclosure of which is incorporated herein in its entirety by reference.

BACKGROUND OF THE INVENTION

1. Field of the Invention

Apparatuses and method consistent with the present invention relate to a content service, and more particularly, to providing an adaptable content service according to the characteristics of a client terminal, and using a content service.

2. Description of the Related Art

Recently, as the infrastructure of the Internet expands and transmission speeds increase, the distribution of digital content through the Internet increases. In order to provide more efficient service through the Internet, various types of multimedia portal service systems are being introduced, including an internet protocol television (IPTV) service. Most current portal services limit the types of terminals which can use them, and most direct their service towards personal computers (PCs). However, as wired/wireless network infrastructures develop and various types of terminals become widespread, technologies to provide portal services to various terminals are being developed.

FIG. 1 is a conceptual drawing of a system for digital content service through the Internet.

Referring to FIG. 1, in the system for digital content service, a multimedia content service is provided to various types of terminals 121 through 127 from a system 110 for multimedia portal service through the Internet. Main service categories of the system 110 include movies, TV, online games, karaoke, music, etc., and the system 110 provides suitable multimedia content to various types of terminals having different media processing capacities and network access speeds, such as a multimedia PC 127, a set-top box (STB) 126, a built-in digital TV (DTV) 125, an MPEG audio layer-3 (MP3) player 124, a portable multimedia player (PMP) 122, and an ultra mobile PC (UMPC) 123.

According to the related art system 110, a data base (DB) stores multimedia content in a limited number of formats. Accordingly, in order to serve content to different types of terminals, a system must recognize the characteristics of a terminal, re-process the content according to the characteristics of the terminal, and provide the re-processed content. For example, when the PMP 122, which has a small screen size and low screen performance, requests high definition (HD) content provided by the system 110, the system 110 transcodes the HD content to a standard definition (SD) or quarter video graphics array (QVGA) level to be suitable to the PMP 122, and serves the transcoded HD content to the PMP 122.

FIG. 2 is a block diagram of a related art apparatus for providing a content service, using the system 110 for multimedia portal service based on a transcoding.

Referring to FIG. 2, the apparatus for providing a content service includes a network manager 260, which monitors network status, a user authenticator 230, a service manager 220, transcoding manager 250, and a content server 210, which includes a DB 240 storing content. The apparatus recognizes the characteristics of a terminal via a user authentication, transcodes or trans-formats the content to be suitable to a client terminal via the transcoding manager 250 according to the type of terminal, and serves the content.

FIG. 3 is a block diagram of a related art apparatus for using a content service, that is, a conceptual block diagram of the terminals 121 through 127 of FIG. 1, which receive a content service from the system 110 of FIG. 1 based on a transcoding.

Referring to FIG. 3, the apparatus for using the content service includes a network interface 310, for connecting to a network, a connection manager 320, for controlling services through the network, a user interface 340, for processing a user input, a multimedia engine 350, for processing multimedia content provided by the system 110, and a presentation engine 330, for displaying the result processed by the multimedia engine 350.

According to the related art system 110 for a multimedia portal system based on transcoding, the transcoding manager 250, installed in a server, re-processes content according to the characteristics of various terminals, and thus the content can be used to all types of terminal. However, as the types of terminals vary and the number of terminals simultaneously connected increases, the content re-processed by the transcoding manager 250 increases by geometric progression, and thus expenses for service also rapidly increase. In addition, the number of users that can be simultaneously connected is limited by the processing capacity of the transcoding manager 250.

SUMMARY OF THE INVENTION

Exemplary embodiments of the present invention overcome the above disadvantages and other disadvantages not described above. In addition, the present invention is not required to overcome the disadvantages described above, and an exemplary embodiment of the present invention may not overcome any of the problems described above.

Aspects of the present invention provide an apparatus and method for providing a content service, which can provide specialized services to each user by including various types of services based on the types of terminals, recognizing the characteristics of a user, a terminal owned by the user, or a display, and selecting the optimum services or content based on the characteristics, and an apparatus and method for using the content service.

Aspects of the present invention also provide an apparatus and method for providing content service, which provides various types of content suitable to various terminals in a home network environment, and an apparatus and method for using the content service.

Aspects of the present invention also provide a method and apparatus for regulating the characteristics of content output from a set-top box (STB) based on the characteristics of a TV connected to the STB, when the STB and the TV are connected in order to use the content service.

According to an aspect of the present invention, there is provided a method of providing a content service to a client via a network, the method including receiving device information from the client; determining a service profile including a list of content and/or services which are to be provided to the client, by analyzing the device information; and providing the content and/or services to the client according to the determined profile.

The determining of the service profile includes determining one service profile for the client from a plurality of predetermined service profiles, according to characteristics of a plurality of types of clients that will use the content service.

The method further includes determining whether to provide the content service by performing an authentication process using user information received from the client.

The device information includes at least one of screen size, resolution, display type, aspect ratio, color information, and speaker type of the client.

According to another aspect of the present invention, there is provided a method of using a content service provided by a server via a network, the method including transmitting device information to the server; receiving information about a service profile, which comprises a list of content and/or services which are provideable, according to the device information, from the server; and receiving the content and/or services according to the information about the service profile from the server.

The receiving of the information about a service profile includes receiving information about a plurality of service profiles, and the method further comprises notifying the server of a service profile selected by a user from the plurality of service profiles as a service profile that is to be provided.

According to another aspect of the present invention, there is provided an apparatus for providing a content service to a client via a network, the apparatus including a smart agent which determines a service profile including a list of content and/or services which are to be provided to the client, by analyzing device information received from the client via a communicator; and a service manager which provides the content and/or service to the client according to the determined service profile.

According to another aspect of the present invention, there is provided an apparatus for using content service provided from a server via a network, the apparatus including a device manager which transmits device information about the apparatus to the server via a communicator, and receives information about a service profile, including a list of content and/or services which are provideable according to the device information, from the server; and a presentation engine which receives the content and/or services according to the information about a service profile from the server and outputs the received content and/or services to a screen.

According to another aspect of the present invention, there is provided an apparatus for using content service provided by a server via a network, the apparatus including a device manager which transmits device information about a display connected to the apparatus to the server via a communicator, and receives information about a service profile, including a list of content and/or services which are provideable according to the device information, from the server; and a presentation engine which receives the content and/or services from the server according to the received information about a service profile, and outputs the content and/or services to the display.

BRIEF DESCRIPTION OF THE DRAWINGS

The above and other features of the present invention will become more apparent by describing in detail exemplary embodiments thereof with reference to the attached drawings in which:

FIG. 7 is a table defining service profiles according to an exemplary embodiment of the present invention;

FIG. 8 shows examples of service profiles corresponding to terminal types, according to an exemplary embodiment of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
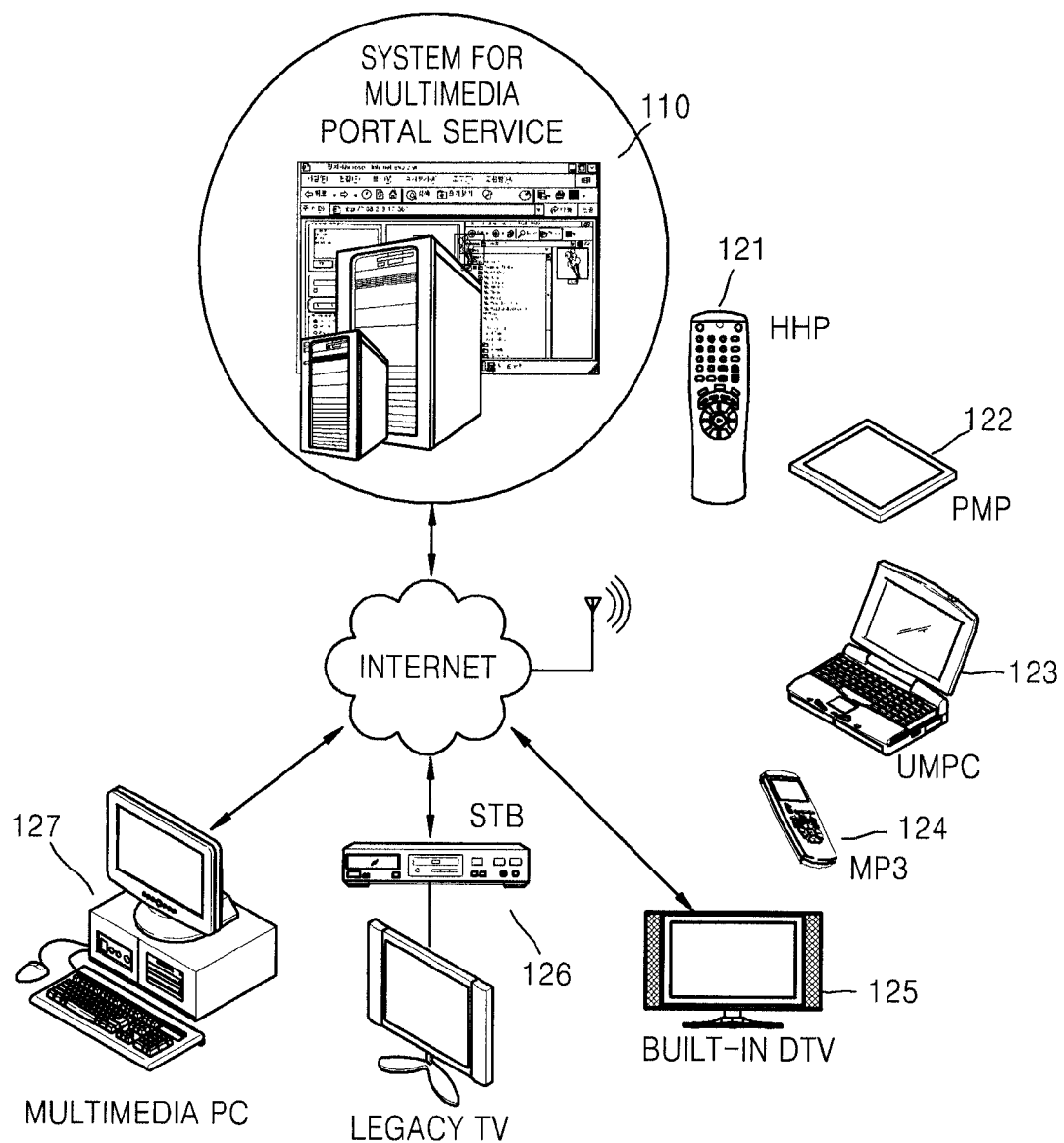
FIG. 1 is a conceptual drawing of a system for digital content service through the Internet.
Figure 2:
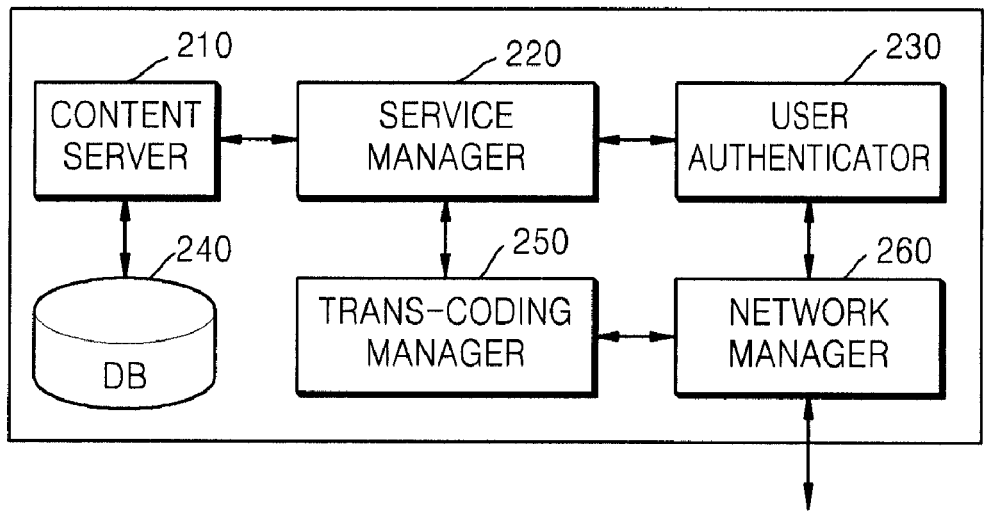
FIG. 2 is a block diagram of a related art apparatus for providing a content service.
Figure 3:
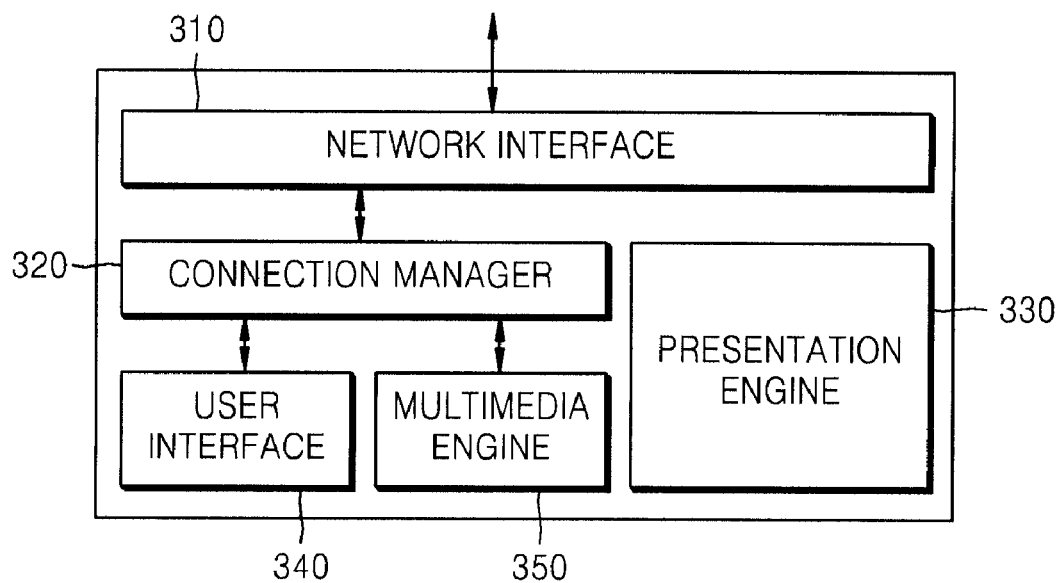
FIG. 3 is a block diagram of a related art apparatus for using a content service.

The basic concept of a system for digital content service, according to an exemplary embodiment of the present invention, is similar to that of the system illustrated in FIG. 1. The various types of terminals 121 through 127 connect to the system 110 for multimedia portal service via a network in order to receive content and/or services. However, the system according to an exemplary embodiment of the present invention adaptively serves digital content according to the characteristics of each of the terminals 121 through 127. The system 110 is an example in which an apparatus for providing a content service according to the present invention is applied, and each of the terminals 121 through 127 are examples of an apparatus for using the content service, but the types of terminals are not limited thereto. Also, it is obvious to one of ordinary skill in the art that the present invention not only applies to an apparatus connected through the Internet, but to any form of network.

Figure 4:
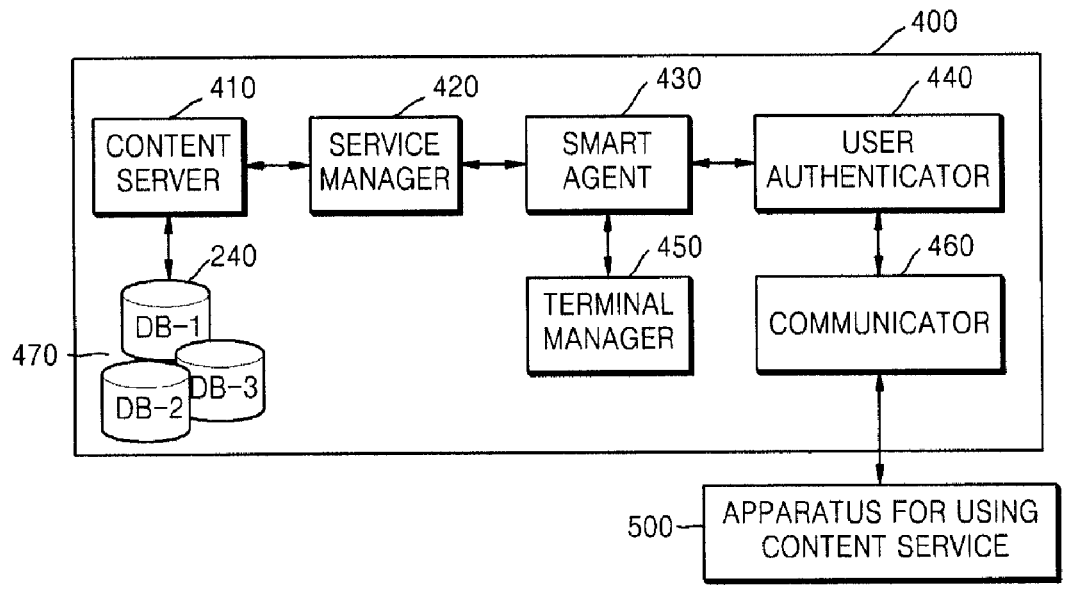
FIG. 4 is a block diagram of an apparatus for providing a content service according to an exemplary embodiment of the present invention.

FIG. 4 is a block diagram of an apparatus 400 for providing a content service according to an exemplary embodiment of the present invention.

Referring to FIG. 4, the apparatus 400 includes a communicator 460 for communicating with a client, that is, an apparatus 500 for using a content service, a smart agent 430 which determines a service profile that is to be provided to the apparatus 500 for using the content service by analyzing device information received from the apparatus 500 for using the content service, and a service manager 420 which provides content and/or services according to the service profile to the apparatus 500 for using the content service. The service manager 420 provides content or services stored in a content DB 470 to the apparatus 500 for using the content service via a content server 410 inside or outside the apparatus 400 for providing the content service. The service manager 420 provides digital content according to the service profile determined by the smart agent 430, to the apparatus 500 for using the content service, via the communicator 460. Also, the apparatus 400 for providing the content service may include a user authenticator 440 which determines whether to provide the content service by performing an authentication process using user information, such as an identification (ID), etc., received from the communicator 460. In this case, the content service is provided only to authenticated users.

The device information analyzed by the smart agent 430 includes characteristics of the apparatus 500 for using the content service, and for example, includes at least one of screen size, resolution, display type, aspect ratio, color information, and speaker type of the apparatus 500 for using the content service. The received device information can be stored and managed by a terminal manager 450. The smart agent 430 analyzes the device information, determines a service profile most suitable to the apparatus 500 for using the content service, and outputs information about the service profile to the service manager 420. The service profile includes a list of content and/or services which are to be provided to the apparatus 500 for using the content service. A plurality of service profiles are pre-defined based on the types or characteristics of a client apparatus that will use the content service, and one service profile is selected according to the device information when the client apparatus requests the content service. Alternatively, only a predetermined service profile generation standard can be defined, and a service profile for corresponding client apparatus can be generated by determining a list of content and/or services provideable according to the device information, when the content service request is received or a user logs in.

Figure 5:
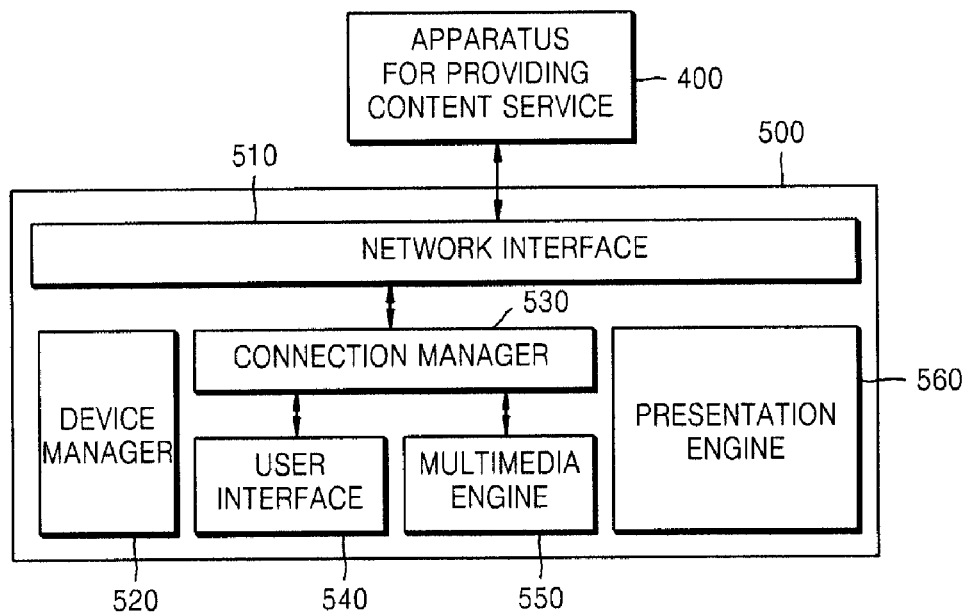
FIG. 5 is a block diagram of an apparatus for using a content service according to an exemplary embodiment of the present invention.

FIG. 5 is a block diagram of an apparatus 500 for using a content service according to an exemplary embodiment of the present invention.

Referring to FIG. 5, the apparatus 500 for using the content service stores device information about the characteristics of the apparatus 500, and includes a communicator, a device manager 520, and a presentation engine 560. The communicator includes a network interface 510 and a connection manager 530 for communicating with the apparatus 400 for providing the content service. The device manager 520 transmits the device information to the apparatus 400 for providing the content service by managing the device information, and receives and manages information about a service profile, including a list of content and/or services determined to be provideable according to the device information, from the apparatus 400 for providing the content service. The presentation engine 560 receives the content and/or service according to the received service profile from the apparatus 400 for providing the content service and outputs the content and/or service to a screen. Also, the apparatus 500 for using the content service may include a user interface 540 which processes a user input and transmits the user input to the device manager 520, and a multimedia engine 550 which processes digital multimedia content transmitted according to a request of a user and transmits the result to the presentation engine 560.

When the user requests a digital content service through a network, the apparatus 500 for using the content service transmits user information, such as an ID, etc., and the device information to the apparatus 400 for providing the content service, through the network interface. The connection manager 530 performs flow control for data communication by controlling communication with the apparatus 400 for providing the content service. The presentation engine 560 outputs processed multimedia data to the user.

As described above, the device information, specifying the apparatus 500 for using content service, includes display screen size (for example, 4", 10", 19", 29", or 40"), resolution (for example, QVGA, VGA, SD, HD, or full HD), display type (for example, PDP, LCD, DLP, or CRT), aspect ratio (for example, 4:3 or 16:9), color information, such as color gamut and color precision, and speaker type (for example, mono, stereo, or surround). However, the device information is not limited to these, and may include other information based on the types of terminal, such as TV, PC, STB, PMP, MP3, or the like.

According to another exemplary embodiment of the present invention, when the apparatus 500 for using the content service is used to connect a display, such as a STB or a TV, the apparatus 500 for using the content service can transmit device information about the connected display to the apparatus 400 for providing the content service in order to be provided with content and/or services suitable to the characteristics of the display. In the current exemplary embodiment, the presentation engine 560 receives content and/or services according to the service profile and outputs the content and/or service to the display.

Figure 6:
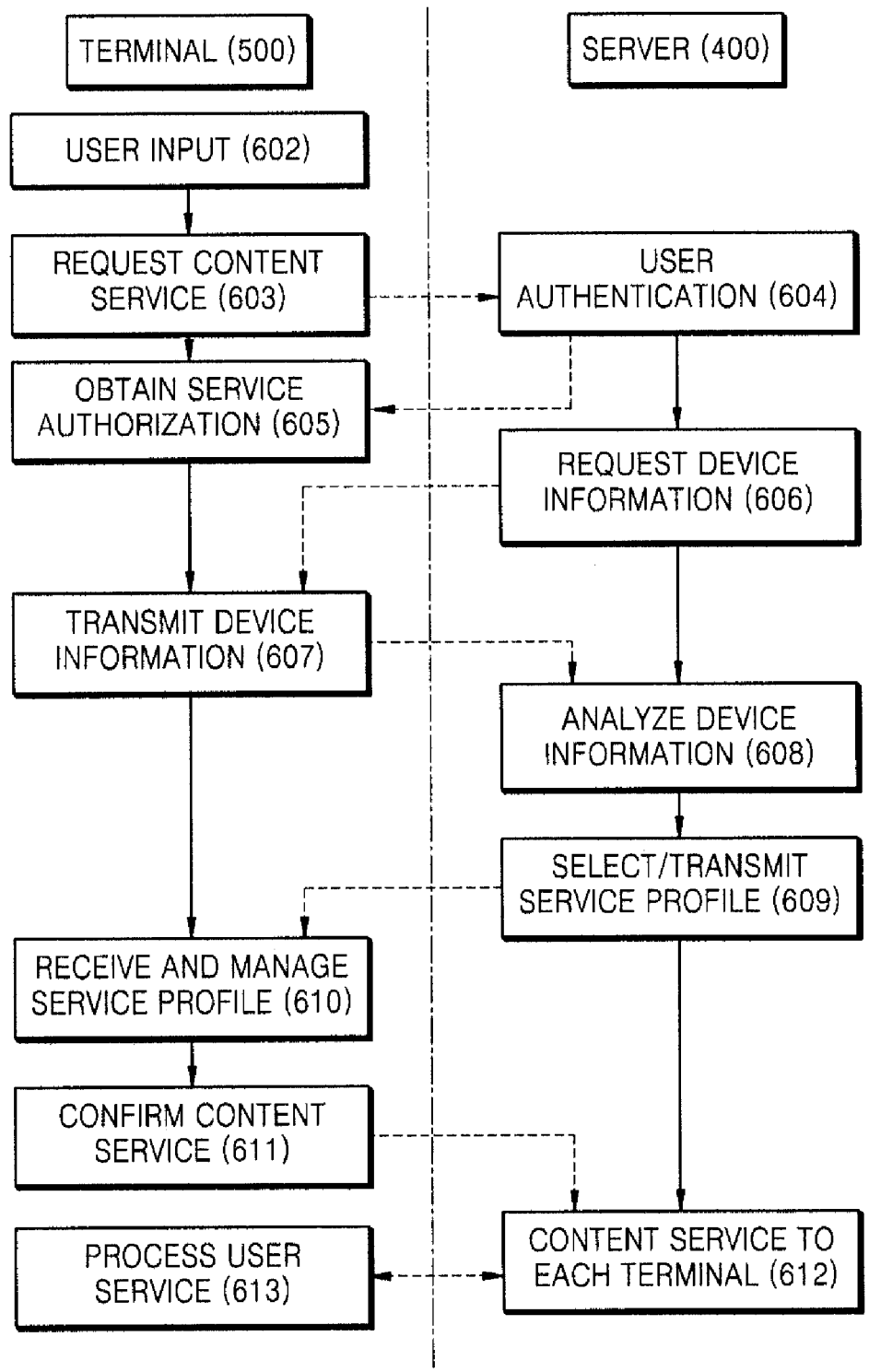
FIG. 6 is a flowchart illustrating a method of providing and using a content service according to an exemplary embodiment of the present invention.

FIG. 6 is a flowchart illustrating a method of providing and using a content service according to an exemplary embodiment of the present invention, in order to provide the optimum service to a terminal 500, which is an apparatus for using the content service.

Referring to FIG. 6, when a user logs in to a server 400 or inputs a request for a content service in operation 602, a device manager 520 requests a content service in operation 603 by transmitting user information to the server 400. The user authenticator 440 determines whether the user that requested the content service is a valid user by performing user authentication in operation 604, referring to user information. When the user is determined to be valid, the user authenticator 440 transmits service authentication to the terminal 500, and thus the terminal 500 obtains an authentication to be provided with the content service in operation 605.

When user authentication succeeds, the smart agent 430 requests device information of the terminal 500, and the device manager 520 transmits the device information to the server 400 in operation 607. The smart agent 430 analyzes the device information in operation 608 in order to select or generate a service profile suitable to the characteristics of the terminal 500, and transmits information about the service profile to the terminal 500 in operation 609. At this time, instead of requesting and receiving the device information, the service profile may be determined by using the device information included in the user information stored and managed by the server 500. The device manager 520 stores and manages the received information about the service profile in operation 610.

When the service profile, determined by the smart agent 430, is required to be checked whether the service profile is suitable to the characteristics of the terminal 500, or when there are a plurality of service profiles that can be provided to the terminal 500, the content service needs to be confirmed in operation 611. The device manager 520 analyzes the information about the service profile in order to determine whether the service profile is suitable to the characteristics of the terminal 500. When the service profile is determined to be suitable, the service profile is determined to be provided to the terminal 500. When a plurality of service profiles are selected and the corresponding information is received, the device manager 520 displays the information about the plurality of service profiles on a screen or a screen of a connected display and the user can select the service profile to be provided through a user interface. The selected service profile is indicated to the server 400.

The service manager 420 provides different content services to each terminal in operation 612 according to the service profile determined by the smart agent 430 or determined and notified by the device manager 520 of the terminal 500. The terminal 500 requests content and/or services according to the service profile to the server 400, and receives the content and/or services in order to be provided with the content service. The multimedia engine 550 and the presentation engine 560 process the received content service and provide the processed content service to the user in operation 613.

FIG. 7 is a table defining service profiles according to an exemplary embodiment of the present invention.

Referring to FIG. 7, n service profiles are defined based on 6 characteristics, such as display screen size, maximum resolution, etc. Each service profile is defined in relation to a list of content and services suitable to be provided to a terminal having the corresponding characteristics. According to an exemplary embodiment, content is re-processed in advance based on each service profile and stored in order to be provided in a format according to the service profile determined based on the terminal.

FIG. 8 shows examples of the smart agent 430 illustrated in FIG. 4 selecting a service profile corresponding to a terminal according to an exemplary embodiment of the present invention.

Referring to FIG. 8, when the terminal is a PMP-1 type having a 4" screen, a content service according to a service profile called service-1 is provided based on the pre-set standard.

Figure 9:
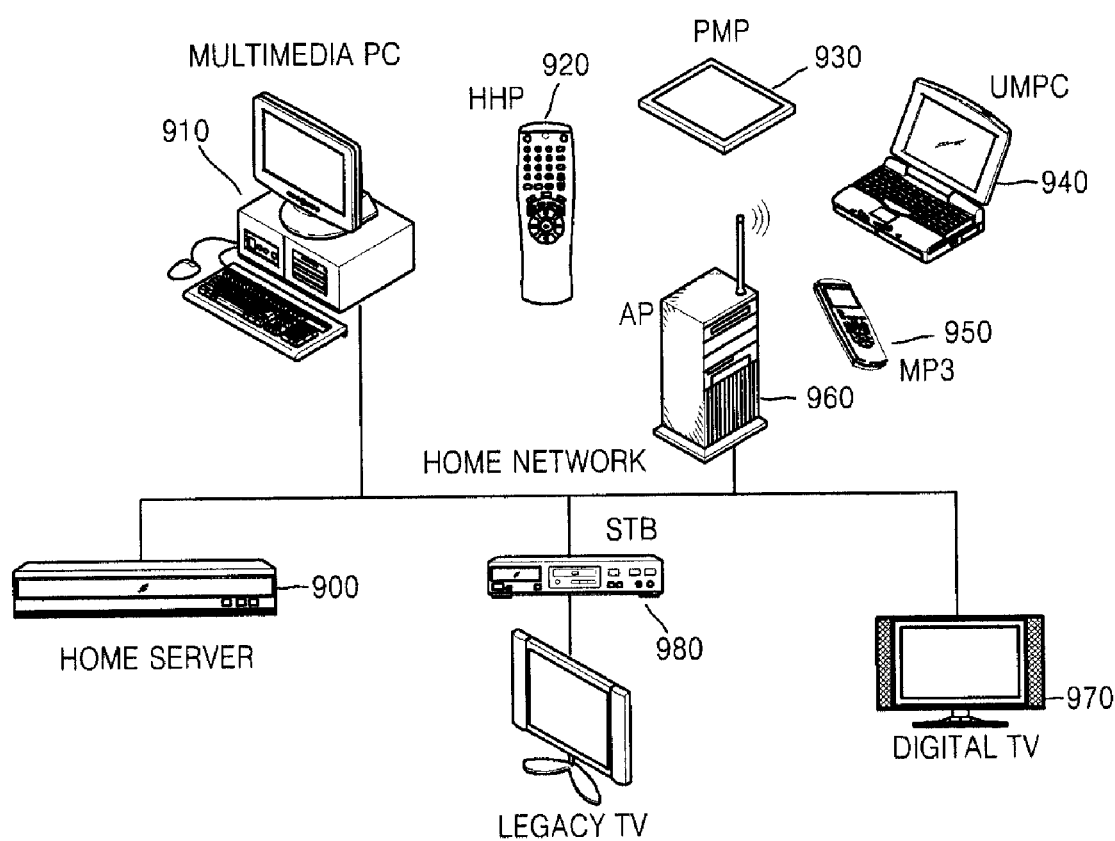
FIG. 9 shows a system for content service applied to a home network, according to an exemplary embodiment of the present invention.

FIG. 9 shows a system for content service applied to a home network according to an exemplary embodiment of the present invention.

The apparatuses for providing and using content service described above can be applied not only to an Internet environment but also to a home network environment. Referring to FIG. 9, in a home network controlled by a home server 900, an apparatus for providing content, such as a PC 910, is the apparatus for providing content service, and apparatuses 920 through 980, to which the content is provided, are the apparatuses for using the content service. In the home network environment, the roles of a server and client can change dynamically, and an apparatus can simultaneously perform the operations of both the server and the client.

The invention can also be embodied as computer readable code on a computer readable recording medium.

By automatically setting services that can be displayed suitably in a terminal, according to device information of the terminal, a service category can be adaptively formed based on the types of terminal, in order to provide the service. Accordingly, the optimum service can be provided to various terminals at minimum expense, and even when the number of supported terminals increases, the required processing capacity increases only linearly, and thus the system cost is much less than those using related art methods.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of providing a content service to a client via a network, the method comprising:

receiving device information from the client;

determining, by a smart agent of an apparatus for providing content, a service profile comprising a list of at least one of content and services to be provided to the client, by analyzing the device information; and providing, by a service manager of the apparatus for providing content, the at least one of the content and services to the client according to the determined service profile, wherein the at least one of the content and services included in the list is suitable to be provided to the client according to the determined service profile, and wherein the content is re-processed and stored in advance of the receiving the device information from the client, based on the service profile.

2. The method of claim 1, wherein the determining of the service profile comprises determining one service profile for the client from a plurality of predetermined service profiles, according to characteristics of a plurality of types of clients that will use the content service.

3. The method of claim 1, further comprising determining whether to provide the content service by performing an authentication process using user information received from the client.

4. The method of claim 1, wherein the device information comprises at least one of screen size, resolution, display type, aspect ratio, color information, and speaker type of the client.

5. A method of using a content service provided by a server via a network, wherein content is re-processed for a plurality of service profiles and pre-stored on the server, the method comprising:

transmitting, by a device manager of an apparatus for using content, device information to the server;

receiving, by the device manager of the apparatus for using content, information about a service profile, from among the plurality of service profiles, which comprises a list of at least one of content and services which are provideable, according to the device information, from the server; and receiving, by a presentation engine of the apparatus for using content, the pre-stored content from the server based on the service profile.

6. The method of claim 5, wherein the receiving of the information about the service profile comprises receiving information about a plurality of service profiles, and the method further comprises notifying the server of a selected service profile, selected by a user from the plurality of service profiles, as a service profile to be provided.

7. The method of claim 5, wherein the device information comprises at least one of screen size, resolution, display type, aspect ratio, color information, and speaker type of a terminal.

8. An apparatus for providing content to a client via a network, the apparatus comprising:

a computer having a memory storing:

a content database which stores content re-processed, respectively, for each of a plurality of service profiles;

a smart agent which determines a service profile, from among the plurality of service profiles, comprising a list of at least one of content and services which are to be provided to the client, by analyzing device information received from the client via a communicator; and a service manager which provides the re-processed and stored content to the client according to the determined service profile.

9. The apparatus of claim 8, wherein the smart agent determines one service profile for the client from a plurality of predetermined service profiles stored in a storage unit, according to characteristics of a plurality of types of clients that will use the content service.

10. The apparatus of claim 8, further comprising a user authenticator which determines whether to provide the content service by performing an authentication process using user information received from the client via the communicator.

11. The apparatus of claim 8, wherein the device information comprises at least one of screen size, resolution, display type, aspect ratio, color information, and speaker type of the client.

12. An apparatus for using content provided from a server via a network, wherein the content is re-processed for a plurality of service profiles and pre-stored on the server, the apparatus comprising:
 a computer having a memory storing:
  a device manager which transmits device information about the apparatus to the server via a communicator, and receives information about a service profile from among the plurality of service profiles, comprising a list of at least one of content and services which are provideable according to the device information, from the server; and
  a presentation engine which receives the pre-stored content from the server, based on the service profile, and outputs the received pre-stored content to a screen.

13. The apparatus of claim 12, wherein the device manager receives and displays information about a plurality of service profiles and notifies the server of a selected service profile, selected via a user interface, as a service profile to be received.

14. The apparatus of claim 12, wherein the device information comprises at least one of screen size, resolution, display type, aspect ratio, color information, and speaker type of the apparatus.

15. An apparatus for using content provided by a server via a network, wherein the content is re-processed for a plurality of service profiles and pre-stored on the server, the apparatus comprising:
 a computer having a memory storing:
  a device manager which transmits device information about a display connected to the apparatus to the server via a communicator, and receives information about a service profile, from among the plurality of service profiles, comprising a list of at least one of content and services which are provideable according to the device information, from the server; and
  a presentation engine which receives the pre-stored content from the server based on the service profile, and outputs the at least one of content and services to the display.

16. The apparatus of claim 15, wherein the device manager displays information about a plurality of service profiles on the display by receiving the information about a plurality of service profiles, and notifies the server of a selected service profile, selected via a user interface, as a service profile to be received.

17. The apparatus of claim 15, wherein the device information comprises at least one of screen size, resolution, display type, aspect ratio, color information, and speaker type of the display.

18. A non-transitory computer readable recording medium having recorded thereon a program for executing a method, the method comprising:
 receiving device information from the client;
 determining a service profile comprising a list of at least one of content and services which are to be provided to the client, by analyzing the device information; and
 providing the at least one of the content and services to the client according to the determined profile,
 wherein the at least one of the content and services included in the list is suitable to be provided to the client according to the determined service profile, and
 wherein the content is re-processed and stored in advance of the receiving the device information from the client, based on the service profile.

19. A non-transitory computer readable recording medium having recorded thereon a program for executing a method, the method comprising:
 transmitting device information to a server;
 receiving information about a service profile, which comprises a list of at least one of content and services which are provideable, according to the device information, from the server, wherein the content is re-processed for a plurality of service profiles and pre-stored on the server; and
 receiving, from the server, the re-processed and stored content, based on the service profile.

* * * * *